April 12, 1966 R. G. LAHR 3,245,348
TOY CARTRIDGES
Filed Jan. 11, 1965 3 Sheets-Sheet 1

INVENTOR.
ROBERT G. LAHR
BY
*John L. Diehl*
Attorney

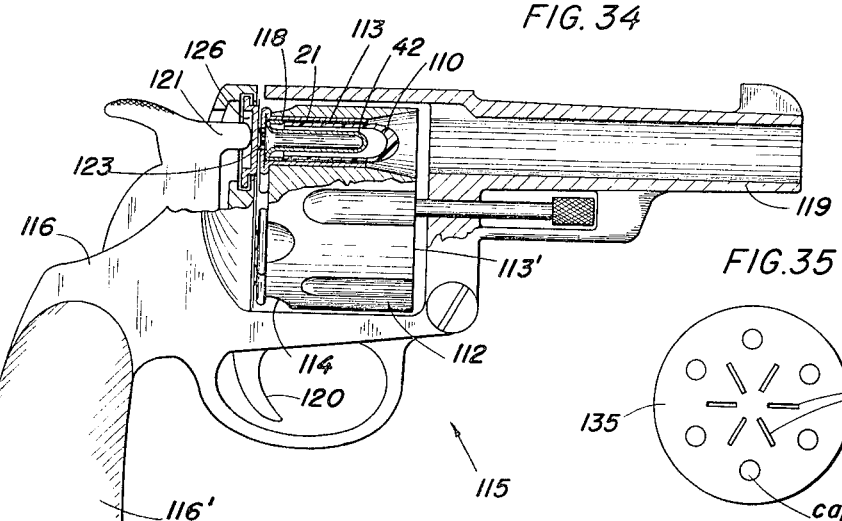

April 12, 1966 R. G. LAHR 3,245,348
TOY CARTRIDGES
Filed Jan. 11. 1965 3 Sheets-Sheet 3
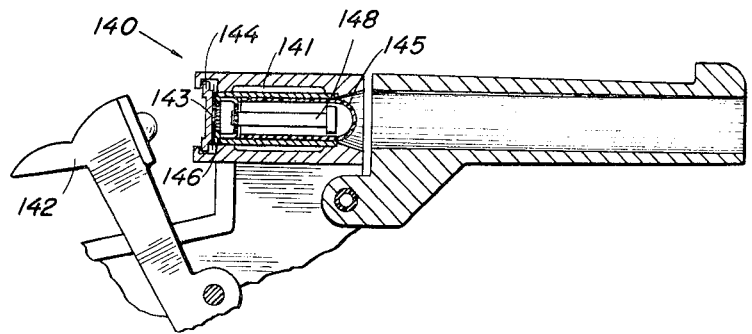
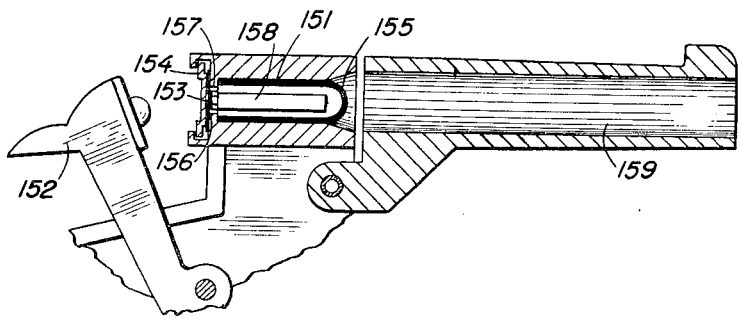
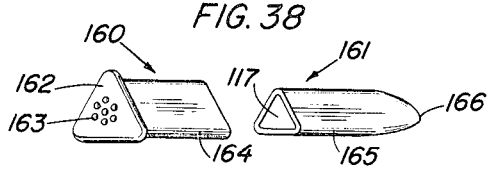
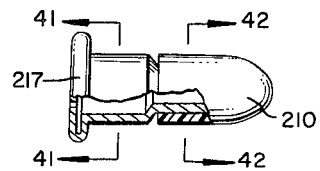
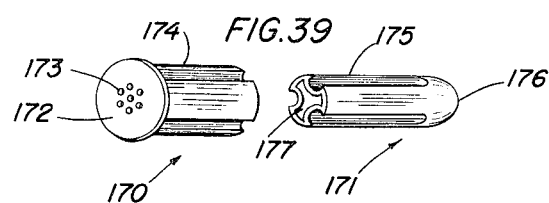
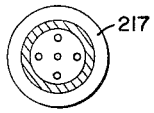
INVENTOR.
ROBERT G. LAHR
BY
Attorney

United States Patent Office 3,245,348
Patented Apr. 12, 1966

3,245,348
TOY CARTRIDGES
Robert G. Lahr, 2464 Amherst Ave.,
West Los Angeles, Calif.
Filed Jan. 11, 1965, Ser. No. 424,480
1 Claim. (Cl. 102—38)

This application is a continuation-in-part of application Serial No. 243,542, filed December 10, 1962, now Patent No. 3,165,058, having the same title which is a continuation-in-part of application Serial No. 702,581, filed December 13, 1957, now Patent No. 3,067,680, having the title "Toy Cartridges and Toy Projectiles Therefor."

This invention in general relates to toy firearms, either rifles or pistols, which fire projectiles and in particular to a toy cap pistol wherein there is utilized an ordinary percussion paper cap as a charge to propel a perfectly harmless projectile. The invention also and especially relates to toy projectiles and toy cartridges which may be utilized in toy firearms of the percussion cap variety.

Heretofore toy firearms have been proposed for utilizing paper percussion caps to propel small solid projectiles. However such toy firearms have performed inconsistently and have been essentially unsafe as toys. Inconsistent performance has been due to imperfections of various sorts which have been difficult to avoid inexpensively. In order to provide a relatively inexpensive toy, the manufacturer must necessarily allow fairly large tolerances between the various parts of the firearm wherein such toy firearms have necessitated maintenance of small tolerances for proper performance. Toy firearms which expel small solid base metal projectiles travel at appreciable velocities and are capable of causing damage to a human eye. Most toy firearms of the heretofore mentioned type can be double or triple loaded; i.e., two or three caps may be superimposed on one another prior to firing, thereby increasing the projectile velocity and the striking force of the projectile. The toy firearms of the previously proposed types are suitable for small game hunting and target shooting but not as playthings for small children. Conceivably, some of these prior proposed toy firearms could be modified to fire a soft solid rubber or other pliable and harmless projectile of fair size. The chief drawback is that other objects such as sticks could be substituted for the projectile providing again a potentially dangerous toy.

The major object of this invention is to provide a completely safe toy firearm of the type heretofore proposed; i.e., one that fires a projectile.

Another object of the present invention is a toy firearm which is mechanically uncomplicated and operates reliably.

Another object of the present invention is a toy firearm which can be manufactured economically.

Another object of the present invention is a toy firearm which simulates an actual firearm both in appearance and in operation.

Another object of the invention is a toy projectile which is absolutely harmless and may be utilized in toy firearms.

Another object of the invention is an obstacle member which prevents the shooting of foreign objects such as sticks to provide a safe toy.

Another object of this invention is a novel barrel-anvil insert which has a multiple function and preferably resembles a cartridge case in external appearance.

A further object is a toy cartridge which simulates an actual cartridge in appearance and may be utilized in toy firearms. The toy cartridge is comprised of the barrel-anvil insert, or toy cartridge case, and the toy projectile and may also include an obstacle in those versions where the simulated cartridge case does not also serve as the obstacle. It should be noted that in no way can the toy cartridge be construed to be a true cartridge for there is no explosive charge contained therein. In some versions, the percussion cap may be attached to the base or anvil portion of the cartridge case, said cap being removed after firing and replaced with a new cap.

The toy pistol can be manufactured in a number of forms to include single shot, double barrel or repeater types. The revolver is generally preferred as it is believed that this type of gun has the most appeal. The invention is not limited to pistols and can be applied to rifles as well.

From a moral standpoint, safety, in a toy cap pistol of this type, is of paramount importance. The unique projectile-obstacle combination in this invention, coupled with other design features which relate to the pistol assures complete safety.

Preferably the toy projectile is thin walled and hollow, has a minimum appreciable mass, is relatively soft and pliable, has no sharp corners or edges, is quite large and is bullet-like in appearance. The projectile may be made of flexible, pliable plastic such as polyethylene, vinyl or other synthetic resinous material. The projectile may also be made of very thin aluminum, wood or other lightweight material, or the projectile may be of sponge rubber, neoprene or other soft and compressible material. It can be readily seen that such a projectile, even if propelled by a double or triple charge, would be quite harmless just as a ping pong ball would be harmless even though thrown by a major league baseball pitcher and for the same reasons.

The obstacle is a safety member which prevents the shooting of objects other than the toy projectile. By obstacle I mean a pin, projecting member or other suitable article which serves to block foreign objects and admit only the toy projectile. The obstacle may also serve to block the passage of powder particles and flash which would otherwise be directed forward through the barrel, i.e., it may act as a baffle as well and this is generally preferred. The barrel-anvil insert, or toy cartridge case, in some versions may also serve as the obstacle. If the toy cartridge case has a shape other than that of a tubular cylinder, such as triangular tubing or square tubing, the toy projectile also being triangular or square in cross-section, most common foreign objects which a child might try to shoot would fit within the toy cartridge case in such a fashion as to permit the majority of the gas, following explosion of the cap, to escape around the foreign object thereby giving the foreign object little if any propulsive force. In still another version, the toy projectile is hollow and fits over the cartridge case rather than within, the cartridge case acting as the obstacle. Utilizing a pin or other suitable member for the obstacle is generally preferred.

The barrel-anvil insert, or toy cartridge case, is preferably formed out of one piece of metal, such as brass or steel. This part can be manufactured in the same inexpensive manner as that employed in the manufacture of actual cartridge cases. The toy cartridge case is preferably a tubular cylinder having a base at one end, said base being perpendicular to the axis of the cylinder. The base has at least one and preferably a multiple number of perforations therein and acts as the firing anvil. The percussion cap is exploded against the anvil by the action of the hammer, the gas escaping through the perforations in the anvil into the casing and expelling the projectile therefrom. Since the percussion cap is placed external to the casing and is not therefor enclosed within either a chamber or the receptacle of the casing, the toy cartridge case is not an actual cartridge case at all but is instead a barrel having an anvil at one end. The toy projectile preferably has an easy slip fit in the barrel being retained therein by friction means and not by crimping as in a true cartridge. In several versions, the projectile is external to the casing rather than internal but this is not preferred. The projectile may also contact the obstacle rather than the toy cartridge case wall and be held by friction to said obstacle but this also is not preferred. The casing, it can be seen, is relatively short, preferably shorter than the toy projectile, and this has been found to be advantageous for a short casing limits the velocity of the toy projectile and yet is adequate to produce the desired result; i.e., the expulsion of a projectile which has a fair range but negligible force. It is possible to have an extension casing adjacent to and continuous with the casing of the toy cartridge but this is not desirable for both safety and economic reasons. The drawings show how a cap can be attached to the anvil of the toy cartridge case by various means such as springs, clips, channels etc., but for convenience and performance reasons it is believed that this is not as satisfactory as other holding and positioning devices whereby the cap is positioned and held by a member or members of the pistol proper. The toy cartridge case with the toy projectile inserted and retained by friction means therein constitutes the toy cartridge either with or without the attachment of the percussion cap thereto. The obstacle, if the case itself does not serve as the obstacle, is included. The toy cartridge is inserted in the chamber of a toy pistol in exactly the same manner as an actual cartridge is inserted in an actual pistol. This feature of realism should provide additional enjoyment of the toy. There is a possibility of losing or misplacing the toy cartridge cases which are relatively more costly to replace than the projectiles. Another version which has less play appeal but which prevents such loss by eliminating need for the cartridge member is a toy gun wherein a barrel-anvil insert is pressed into the chamber or cylinder pocket and locked therein to provide an integral non-removable part of the toy pistol. The toy projectile is then obviously inserted into the fixed barrel of the pistol from the front. In this version, the base of the barrel-anvil insert has the same outside diameter as the barrel of the insert. It should be noted that in either version, unless the barrel-anvil insert is in the pistol, no cap can be exploded hence no projectile can be expelled for the pistol is without an anvil. It will be evident that the barrel-anvil insert in the non-removable version can be eliminated completely. The cylinder of the pistol can be cast or machined to size and one or more perforations likewise provided.

The toy pistol embodies a number of features which are not found in an actual pistol. What externally appears to be the barrel of the toy pistol, is preferably not an actual barrel or barrel extension but merely an extended portion with an oversized bore having no function and as such only improves the aesthetic value of the toy pistol. The toy projectile when in flight in traveling through such member which may be described as a false barrel, does not intentionally contact the false barrel but may accidentally do so occasionally. The false barrel may consist of two castings which, when joined by conventional means form a tubular cylinder. The bore may be left in rough casting form, no machining being required. It will be evident that the axial alignment between the barrel-anvil insert, or true barrel, and the false barrel is not critical. This allows the use of a relatively crude and inexpensive cylinder indexing mechanism in the toy revolver, some over or under travel of the cylinder being permitted. There is preferably a fairly large gap between the rotating cylinder and the false barrel which eliminates machining the adjacent parts and also allows for the escape of the propelling gas in the event a child would insert a foreign object into the false barrel and attempt to shoot the object. The forward end of the cylinder pocket, or barrel-anvil insert receptacle, may be tapered to provide an additional safety feature.

The hammer of the toy pistol can contact the percussion cap directly but a preferred version includes an intermediate floating plate. In this version, the cap is preferably not attached to the rear of the barrel-anvil insert but is held in position by a member or members of the toy pistol, the powder side of the cap facing the firing anvil. The floating intermediate plate is disc shaped and has a continuous offset circular flange, said flange loosely engages circular grooves in the toy pistol frame casings and is so retained therein. The hammer, when activated by the trigger, strikes the floating intermediate plate, compressing the cap between the plate and the anvil causing the explosion of the cap. The floating intermediate plate seats flush with the firing anvil and prevents the escape of both powder particles and gas from between the plate and the anvil. The floating intermediate plate not only provides for a better and more positive means of detonating the cap but it has a safety value as well.

It will be evident that all of the toy pistol features mentioned will provide for both an economical toy and a safe toy. It is also evident that the toy pistol does not necessarily require inclusion of all these features in order to be operative but in accordance with the invention an obstacle is provided in every instance to prevent insertion of an alternative object in place of the projectile of the invention.

In the description of the drawings, the barrel-anvil insert, or toy cartridge case will be referred to as the cartridge casing or casing of the resemblance to an actual cartridge casing and to simplify terminology.

Referring now to the figures, like reference numerals refer to like parts and:

FIGURES 1 thru 5 are end views of cartridge casings of the invention;

FIGURES 6 and 7 are side elevations of cartridge casings of the invention;

FIGURES 8 thru 16 are cross-sectional views of obstacles to be contained within the cartridge casings of the invention;

FIGURE 17 is a cross-sectional view of an obstacle to be contained with a cartridge casing as a part of the casing;

FIGURES 18 thru 23 are cross-sectional views of projectiles utilized in the cartridge of the invention;

FIGURES 24 thru 26 are perspective views of means to hold percussion cap to be exploded in place on the castings of the invention;

FIGURES 27 thru 33 are cross-sectional views of cartridges of the invention;

FIGURE 34 is a partially cut-away cross-sectional view of a pistol of the invention;

FIGURE 35 is a plan view of a percussion cap suitable for use in the firearm of the invention;

FIGURE 36 is a portion of the partially cut-away cross-sectional view of a pistol of the invention;

FIGURE 37 is a partially cut-away cross-sectional view of a portion of the pistol of the invention;

FIGURE 38 is a perspective view of a casing of the invention and projectile adapted to fit within the casing; and FIGURE 39 is a perspective view of a casing of the invention and projectile adapted to fit within the casing;

FIGURE 40 is a partially cross-sectional partially cut-away view of another embodiment of a cartridge;

FIGURE 41 is a cross-sectional view taken on lines 41—41 in FIGURE 40;

FIGURE 42 is a cross-sectional view taken on lines 42—42 in FIGURE 40.

There are shown in the figures, modifications of each component of the toy cartridges as well as modifications of the toy cartridges.

The base of the cartridge casing utilized for holding the cartridge casing within the receptacle or chamber or revolving cylinder of the pistol or revolver may have any shape which will allow the base to act as the anvil of the piston or revolver, i.e., triangular, square, H-shaped, or cross-shaped, as long as the base is not too thin, is preferably flat, and provides perforations in a portion thereof to allow the gas from the exploded cap to escape therethrough to cause the projectile to be expelled therefrom.

For example, there is shown in FIGURES 1 thru 5, various bases suitable for use in the cartridge casing of my invention.

Figure 1:
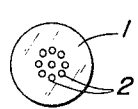
Figure 2:
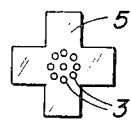
Figure 3:
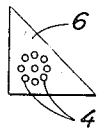
Figure 4:
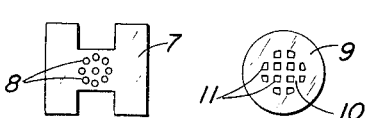
Figure 5:
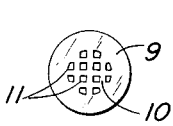

FIGURE 1 shows a circular metal cartridge casing base 1 which was discrete perforations having the general designation 2 therethrough and which are encircling and/or at the mid-point of base 1. FIGURE 2 shows a cross-shaped metal cartridge casing base 5 which has discrete perforations having the general designation 3 therethrough and which are encircling and/or at the center of said cross. FIGURE 3 shows a triangular metal cartridge casing base 6 which has discrete perforations having the general designation 4 therethrough and which are encircling and/or at the mid-point of said base. FIGURE 4 shows an H-shaped metal cartridge casing base 7 which has discrete perforations having the general designation 8 therethrough and which are encircling and/or at the center of said base. FIGURE 5, however, shows a circular metal cartridge casing base comprising a solid metal rim 9 and a grid 10 forming perforations having the general designation 11 which allows the gas from the exploding cap to escape therethrough.

Figure 6:
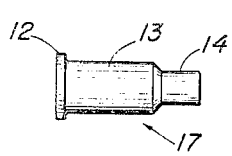

The casing of FIGURE 6 adapted to be received in a firearm and to provide a firing chamber therein comprises a base 12 having perforations therein and extending perpendicular therefrom a tubular member 13 of slightly smaller diameter than base 12. At a predetermined distance from said base and along the axis of member 13, member 13 tapers sharply inward for a predetermined distance and then straightens out to form another tubular member 14 of slightly smaller diameter than member 13. Member 14 extends along the axis of member 13 for a predetermined distance to form the cartridge casing having the general designation 17.

Figure 7:
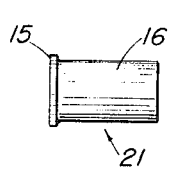

FIGURE 7 is a cartridge casing adapted to be received in a firearm and to provide a firing chamber therein having the general designation 21 and comprising a base 15 having perforations therein (not shown) and a hollow cylinder 16 of predetermined length perpendicularly attached to base 15, said cylinder extending along the axis of said base and being of slightly smaller diameter than base 14.

There are shown in FIGURES 8 through 17, various modifications of obstacles suitable for use in the cartridge casings of the invention for the purpose of preventing the shooting of foreign objects such as sticks from the toy pistols of the invention.

Figure 8:
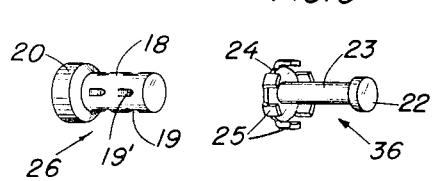

FIGURE 8 is an obstacle having the general designation 26 which is adapted to fit within the casing of FIGURE 7 consisting of a hollow cylinder 18 of predetermined length which is closed at one end and open at one end having inwardly extending tabs 19, 19' therein to allow escape of gas therefrom. The open end of said cylinder extends outwardly until the outer circumference of the cylinder is slightly less than the inner circumference of the casing to be used, whereupon the outwardly extending end of the hollow cylinder is extended for a predetermined distance to form a cylinder 20. The projectile thus formed may be inserted into a casing to prevent the insertion and shooting of foreign objects.

Figure 9:
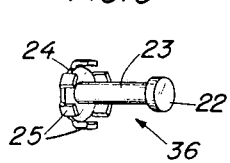

FIGURE 9 is an obstacle having the general designation 36 consisting of flange 22 having a circumference less than the inner circumference of the projectile used; a solid metal member 23 of predetermined length rigidly affixed thereto and along the axis thereof. Member 23 may be cylindrical or rectangular. Member 23 is rigidly affixed to a flange 24 which has a circumference slightly less than the inner circumference of the casing into which it is to be inserted. Flange 24 has as a part thereof and at the outermost edge thereof a plurality of tabs having the general designation 25, said tabs extending in an outwardly direction from said solid member 23 to have a slightly greater diameter than the inner diameter of the casing to be used so that when the obstacle is placed within a casing, a tight fit may be obtained.

Figure 10:
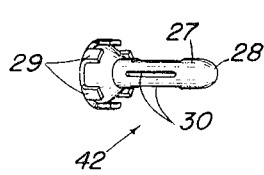

FIGURE 10 consists of hollow cylindrically shaped member 27 closed at one end to provide a bullet shaped nose 28 and tapered outwardly at the open end until the outer diameter of the member 27 is slightly less than the inner diameter of the casing to be used. The outwardly tapered member has attached at the outermost edge thereof a plurality of tabs having the general designation 29, said tabs extending in an outwardly direction from the member 27 to provide a member having an outer diameter slightly greater than the inner diameter of the casing to be used so that when the obstacle is inserted into a casing, a tight fit may be obtained. This resultant obstacle has the general designation 42 and may have a plurality of holes in the nose 28 or may have as in this figure, a plurality of slots having the general designation 30 in the side of the cylindrically shaped member 27 for allowing escape of the gas therefrom.

Figure 11:
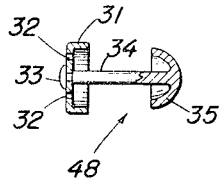

FIGURE 11 is an obstacle having the general designation 48 and consisting of a cup 31 adapted to hold the obstacle within the cartridge casing to be used, said cup having perforations having the general designation 32 in the base thereof to allow escape of the gas from an exploding percussion cap and having a solid metal member 34 which is parallel to the sides of cup 31 rigidly attached through a hole in the base of cup 31 by means of rivet 33 along the axis of said cup. The opposite end of member 34 is rigidly affixed by means of solder or other suitable metal joining technique to the center of a half sphere 35 having a diameter less than the inner diameter of the projectile to be inserted around the obstacle.

Figure 12:
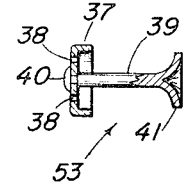

FIGURE 12 is an obstacle having the general designation 53 and consisting of a cup 37 adapted to hold an obstacle within the cartridge casing to be used wherein the base of the cup has perforations having the general designations 38 therein, and a solid metal member 39 parallel to the sides of cup 37 and of predetermined length which is rigidly attached thru a hold in the center of the base of cup 37 by means of a rivet 40 or other suitable means so that it extends along the axis of said cup. The end of member 39 opposite rivet 40 flares to form flared end 41. The diameter of the flared end should be such that the obstacle fits within the cartridge casing and that a projectile fits into the casing around the obstacle.

Figure 13:
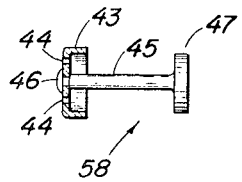

FIGURE 13 is an obstacle having the general designation 58 and consisting of a cup 43 adapted to hold an obstacle within a cartridge casing wherein the base of the cup has perforations having the general designation 44 therein and a solid metal member 45 parallel to the sides of cup 43 and of predetermined length rigidly attached at the center of the base of cup 43. The end opposite rivet 46 of member 45 is rigidly affixed to flange 47 by means of solder or other metal joining technique. Flange 47 has a diameter which is less than the inner diameter of the projectile which is to be inserted around the obstacle in the casing.

Figure 14:
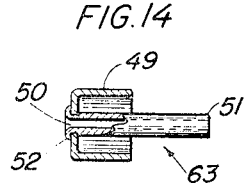

FIGURE 14 is an obstacle having the general designation 63 and consisting of a cup 49 having perforations having the general designation 50 in the base thereof and a hollow cylindrical member 51 which is of predetermined length rigidly attached by means of rivet 52 to the base of the cup, parallel to the axis of cup 49.

Figure 15:
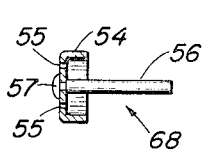

FIGURE 15 is an obstacle having the general designation 68 and consisting of a cup 54 having perforations having the general designation 55 in the base thereof and having a solid metal member 56, which is parallel to the sides of cup 54 and is of predetermined length, rigidly attached to the base of cup 54 by a rivet 57 or other suitable means so that member 56 extends along the axis of cup 54, said cup adapted to fit within a cartridge casing.

Figure 16:
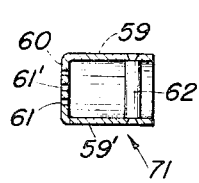

FIGURE 16 is an obstacle having the general designation 71 and consisting of two solid metal members 59 and 59' of predetermined length joined by a soldering or other suitable metal jointing technique at one end, by a solid metal member 60 having perforations having the general designation of 61 and 61' therein and being of a length slightly less than the inner diameter of the casing in which the obstacle is obtained. Solid metal member 62 is joined to solid member 60 by soldering or other suitable metal joining technique.

Figure 17:
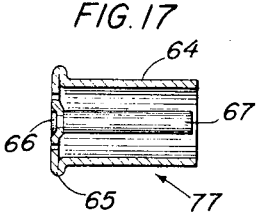

FIGURE 17 is a cartridge casing having the obstacle as an integral part thereof and having the general designation 75 and consisting of a hollow cylinder 64 flanged by means of flange 65 at one end. A solid member 67 of predetermined length is attached by a rivet 66 to the inner base of the casing so that it extends along the axis of flange 65, said attachment being so made that the outer surface of flange 65 is flat.

FIGURES 18 through 22 show various modifications of projectiles suitable for use in the invention.

Figure 18:
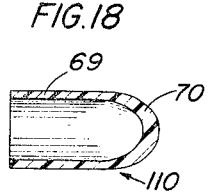

FIGURE 18 is an elongated recessed projectile having the general designation 110 and comprising a hollow cylinder 69 of predetermined thickness and predetermined length which is open at one end, and closed at the opposite end in such a manner as to form a streamlined nose 70, said cylinder in this case being of flexible polyethylene. Projectile 75 may be used within or without a cartridge casing depending on the diameter of said projectile.

Figure 19:
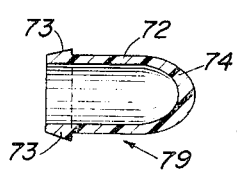

FIGURE 19 is an elongated recessed projectile having the general designation 79 and comprising a hollow cylinder 72 of predetermined thickness which has an open end and a closed end, the surfaces adjacent said open end extending outwardly to form a solid plastic rim 73 adapted to hold the projectile within a cartridge casing, said closed end being closed in such a manner as to form a bullet shaped nose 74.

Figure 20:
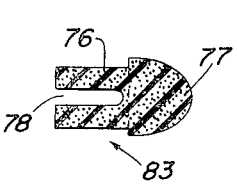

FIGURE 20 is a solid elongated projectile having the general designation 83 made of flexible plastic such as sponge rubber. The solid projectile consists of a cylindrically shaped member 76 having a bullet shaped nose 77. The end opposite the bullet shaped nose 77 may be slotted by means of slot 78 extending through the axis of the projectile and extending for a predetermined distance through the projectile.

Figure 21:
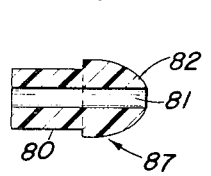

FIGURE 21 is a solid elongated projectile 87 of flexible plastic such as polyethylene consisting of a cylindrically shaped body 80 having an axial bore 81 therethrough and having a bullet shaped nose 82 wherein that portion of the nose contacting said body is of larger diameter than the diameter of the body.

Figure 22:
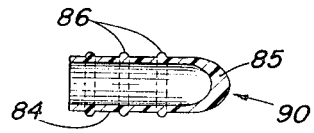

FIGURE 22 is an elongated recessed projectile having the general designation 90 and comprising a hollow cylinder 84 of predetermined thickness which is open at one end and closed at the opposite end in such a manner as to form a bullet shaped nose 85, said cylinder having along the outer surface thereof a plurality of small solid ridges having the general designation 86 by which the projectile is adapted to be held within a casing.

FIGURE 23 is an elongated recessed projectile 96 and consisting of hollow cylinder 88 of predetermined thickness and predetermined length which is open at one end and closed at the opposite end to provide a streamlined nose 89 said cylinder having a plurality of bumps 130 thereon for retaining the projectile within the chamber of the firearm.

FIGURES 24 thru 26 show different means for holding the percussion cap in place.

FIGURE 24 shows a cartridge casing wherein the base 91 of a casing 92 has two metal rims 93 and 93' respectively as a part thereof. Rims 93 and 93' are so affixed to the base 91 of casing 92 as to form two channels 94 and 94' respectively. Percussion cap 95 is then pushed down between the two rims into the two channels and may be held in place by rims 93 and 93' respectively.

FIGURE 25 is a spring clip 97 for holding a percussion cap 102 in place during utilization of a gun. Clip 97 fits by means of tab 98 over the base 99 of casing 100 and fits around the casing 100 by means of metal strip 101.

FIGURE 26 is a means for holding a cap in place having the general designation 109 and consisting of a circular piece of metal 103 hinged to the base 104 of casing 105 by hinge 106. Opposite hinge 106 on the inner surface of the metal 103 is a means which is inserted into hole 107 in casing base 104 to hold the percussion cap 108 in place.

FIGURES 27 thru 33 are projectiles for use in the pistol or revolver of my invention. The projectiles are formed by different combinations of the casings of FIGURES 6 and 7, the obstacles of FIGURES 8 thru 17, the projectiles of FIGURES 18 thru 23, and if a means for holding a cap in place is desired the means of FIGURES 24 thru 26.

FIGURE 27 is a toy cartridge consisting of the casing 75 of FIGURE 17, wherein said casing has an obstacle as an integral part thereof, the projectile 40 of FIGURE 18, and the means for holding the cap in place as shown in FIGURE 24.

FIGURE 28 is a cartridge consisting of the casing 17 of FIGURE 6 and the projectile 110 of FIGURE 18. Casing 17 is fitted within hollow projectile 110.

The embodiment of FIGURES 40, 41 and 42 is a modification of that of FIGURE 28; the projecting portion of casing 217 which extends into the recess in the rear of projectile 210 may have any suitable cross-sectional shape: It may be generally quadrilateral with deformed walls as shown or may alternatively have the general form of a triangle or ellipse or other suitable shape. The configuration of the recess is preferably such as to provide a loose sliding removable fit with the extending portion of the casing.

FIGURE 29 is a cartridge consisting of the casing 21 of FIGURE 7, the obstacle 71 of FIGURE 16, and the projectile 83 of FIGURE 20, wherein the casing has fitted therewithin obstacle 71. Projectile 83 is then fitted within the cartridge casing and around the obstacle.

FIGURE 30 is a cartridge consisting of the casing 21 of FIGURE 7, the obstacle 42 of FIGURE 10 and the projectile 110 of FIGURE 18, wherein casing 21 has fitted therewithin obstacle 42 and projectile 110 said projectile being so inserted that only the bullet shaped nose protrudes therefrom and so that it fits around obstacle 42.

FIGURE 31 is a cartridge consisting of the casing 21 of FIGURE 7, the obstacle 63 of FIGURE 14 and the projectile 110 of FIGURE 18, wherein the casing is fitted with obstacle 63 and projectile 110.

FIGURE 32 is a cartridge consisting of the casing 75 of FIGURE 17 wherein the casing contains as a part thereof an obstacle and the projectile 87 of FIGURE 21. The projectile is inserted into casing 75 around the obstacle contained therewithin.

FIGURE 33 is a cartridge consisting of the casing 21 of FIGURE 7, the obstacle 48 of FIGURE 11, and the projectile 110 of FIGURE 18. Casing 21 has fitted therewithin obstacle 48. A hollow projectile 110 may then be inserted in casing 21 around obstacle 48 so that preferably only the bullet shaped nose of the projectile protrudes from the casing.

FIGURE 34 shows a pistol having the general designation 115 comprising a frame 116 having a handle 116' as a part of the frame. Frame 116 has an opening therewithin which has a cylinder 112 rotatably mounted within the opening so that a large opening between the rotatably mounted cylinder and the barrel of the gun is provided for escape of any gas leakage. The cylinder 112 is provided with a succession of circumferentially spaced cartridge receiving pockets 113 and 113' open at both ends of the cylinder and adjacent said pockets a series of indentations 114 used when reloading the casing therefor, a cartridge 118 adapted to fit co-axially in each pocket and comprised of a casing 21 having perforations in the base thereof, and adapted to provide a firing chamber therein, an obstacle 42 adapted to prevent the shooting of foreign objects from the pistol, said obstacle extending from said casing into a recess in a projectile and an elongated recessed projectile 110 adapted to be contained within the casing and around the obstacle. The frame also has an oversized barrel 119 which while it has no use, it increases the pistol's aesthetic value and a trigger 120 which actuates hammer 121 carried by the frame 116 to strike intermediate plate 126 causing explosion of the cap 123 placed between the intermediate plate and the base of the casing. The trigger actuated hammer is operatively connected with the cylinder 112 to rotate the cylinder for successively bringing cylinder pockets into alignment with the path of hammer stroke by means of indexing fins (not shown). Cylinder pockets 113 are preferably flared at the end opposite the end receiving cartridges.

There is shown in FIGURE 35, a disc of percussion caps generally indicated as 133 consisting of a paper laminate 135 having a plurality of slots 136 adapted to fit over the indexing fins of a rotating cylinder of a fiirearm and adapted to contain between said laminate a predetermined amount of powder between said slots.

FIGURE 36 shows part of a toy firearm 140 consisting of a chamber 141 suitably located to have a projectile fired therefrom, a hammer 142, a cap 143, and an intermediate floating plate 144 adapted to fit between hammer 142 and cap 143, an elongated recessed projectile 145, an anvil plate 146 which is a portion of a cartridge casing removably inserted into said chamber and which contains at least one aperture, the cartridge chamber 141 providing a firing chamber and having projectile 145 received therein and an obstacle member 148 attached to the anvil member 146 and extending therefrom.

There is shown in FIGURE 37, part of a toy firearm consisting of a chamber 151 suitably located to have a projectile fired therefrom, a hammer 152, a cap 153 and an intermediate floating plate 154 adapted to fit between the hammer 152 and the cap 153; an elongated recessed projectile 155, an anvil plate 156 securely attached to said firearm and containing at least one aperture 157, an obstacle member 158 attached to said anvil member and extending therefrom and an oversized barrel 159.

FIGURE 38 shows a cartridge casing 160 and projectile 161. Cartridge casing 160 is adapted to fit in the chamber of a firearm and to contain an obstacle member and a projectile consists of a triangularly-shaped anvil plate 162 adapted to retain casing 160 within the chamber of a toy firearm and having at least one aperture 163 therein and triangularly shaped tubing 164 of predetermined length affixed to said plate 162. Projectile 161 consists of triangularly shaped tubing 165 having a streamlined closed end 166 and an open end 177 having a recess therein said projectile adapted to fit around an obstacle member and to fit within casing 160.

FIGURE 39 shows a cartridge casing 170 and projectile 171. Cartridge casing 170 adapted to be fitted in the chamber of a toy firearm and to contain an obstacle member and a projectile consists of circular anvil plate 172 adapted to retain casing 170 within the chamber of a toy firearm and having at least one aperture 173 therein and partially cut-away cylindrically shaped tubing 174 affixed to said anvil plate 172. Elongated recessed projectile 171 consists of partially cut-away cylindrically shaped tubing 175 having a streamlined closed end 176 and an open end 177 having a recess therein said projectile adapted to fit around an obstacle member and to fit within casing 170.

While FIGURE 34 shows a revolver, the invention also relates to an automatic. This pistol comprises a frame having a chamber and a cartridge adapted to fit co-axially in said chamber, each cartridge comprises a casing in a projectile. The casing comprises a base having a plurality of perforations therein and a tubular receptacle perpendicularly affixed thereto to extend along the axis of said base, the receptacle being adapted to receive a flexible, pliable solid member having a recess therewithin adapted to receive an obstacle and having a means adapted to prevent the escape of gas therefrom. The trigger of the pistol is adapted to actuate a hammer, and there is a floating intermediate plate between the hammer and the chamber. The chamber is internally flared at the open end opposite the cartridge receiving end. A cap may be placed between the base of the casing and the intermediate plate, and then upon pulling of the trigger, the hammer may be actuated to strike the intermediate plate causing the cap to explode. Upon explosion of the cap, the gas escapes thru the base of the cartridge casing, said casing contained in the chamber and thru the obstacle into the recess of the projectile. The force of the gas entering the recess causes the projectile to be expelled from the casing and the chamber.

Any of the cartridges shown in the figures may be utilized in the pistols of the invention.

It should be noted that the obstacles utilized in the cartridges of the invention all provide a means by which sufficient gas may escape to allow expulsion of a projectile. For example, in FIGURES 9 and 10, the gas may escape between the tabs, in FIGURE 8 the gas may escape through the slots and in FIGURES 11 through 16 the gas may escape through perforations in the cup. It should also be noted that all of the projectiles have a means for preventing the escape of gas therefrom.

It should be noted that there may be many combinations of casings, obstacles, projectiles and means for holding a cup in place which have not been shown in the figures and which are intended to be included as a part of the invention.

The percussion cups utilized in my revolver preferably fit over the indexing fins of the rotating cylinder so that the powder containing side of the percussion caps contacts the firing anvil; however this is not necessary.

The obstacles and projectiles of the present invention may also be utilized in pistols heretofore proposed by fitting the obstacle and/or projectiles into the cylinder receiving pockets thereof. The obstacle may be utilized by affixing a rod directly to the anvil of a toy pistol heretofore proposed so that it projects into the hollow recess of a projectile. Alternatively it may be attached to and extend into the barrel of a pistol when the pistol is a single shot pistol. However, it may be preferable to utilize an obstacle of the type shown in FIGURES 8 through 16 in pistols heretofore proposed and this may be accomplished by insertion of the obstacle directly into the cylinder receiving pockets.

The projectiles of the present invention may be inserted directly into the pockets of the rotatably mounted cylinder of pistols heretofore proposed so that the nose of the projectile is directed towards the barrel of the gun or if desired may be used in pistols heretofore described when obstacles are also to be utilized in the pistols. In this case, the projectile is inserted into the cylinder around the obstacle.

It may thus be seen that my invention comprises a toy firearm having as a part thereof a chamber suitably located to have a projectile fired therefrom, the combination of a hammer, a cap, an intermediate floating plate between the hammer and the cap and an elongated recessed projectile, an anvil plate having at least one aperture therein and being located between the projectile and the cap and an obstacle member extending within said chamber into a recess in the projectile. The anvil member may be securely attached to the firearm and contains at least one aperture and the obstacle member may be attached to said anvil member and extend therefrom or the anvil member may be securely attached to the firearm and the obstacle member may be attached to at least one wall of the chamber and extends therefrom laterally into said chamber, or the anvil member may be a portion of a cartridge casing removably inserted into the chamber and the obstacle member may be provided by an extended portion of the casing.

My invention also provides a toy cartridge comprising the combination of a casing to be received in said firearm to provide a firing chamber therein, an elongated recessed projectile member received in said casing and an obstacle member extending from said casing into a recess in said projectile.

The projectile of the invention comprises an elongated member to be received in a firing chamber in said firearm said member having a nose at least partially streamlined and having a recess to receive an obstacle extending from an adjacent member to prevent replacement of the projectile by another projectile of similar size having a body of substantially cylindrical shape.

The obstacle of the invention comprises an extended portion to be received by a corresponding recess in a projectile and means for supporting and retaining the extended portion within a chamber, said extended portion comprising a rod-like member extending along the axis of said chamber or across said chamber, or inwardly from a wall of said chamber, to be received by a corresponding recess in the projectile.

It is to be understood that this pistol is superior to ordinary cap pistols or to the type of pistol hereinbefore described since my pistol expels only a flexible projectile which is not harmful and since real cartridges, sticks or other objects cannot be shot from my pistol. My pistol is also superior to previous proposed pistols in that no powder particles can escape upon explosion of the percussion cap since the hammer seats flush with the base of the cartridge casing due to the floating intermediate plate. The pistol of the present invention will also give children added enjoyment since the child has the enjoyment of seeing a projectile expelled from a weapon.

Having thus disclosed my invention, I claim:

A cartridge comprising the combination of:
(1) a projectile member,
(2) a casing,
said casing having:
(3) a front end,
(4) a rear end,
(5) a recess extending axially rearwardly from said front end and
(6) at least one aperture in said rear end communicating said recess with the space outside and to the rear of said rear end,
said projectile member having:
(7) a front end and
(8) a rear end and
(9) a recess opening rearwardly at said rear end,
said projectile member:
(10) received axially slidably loosely on to the outside of the front end of said casing and
(11) unconnected to said casing otherwise, wherein said casing is configured to provide a portion having a polygonal tubular cross-sectional form, extending in the recess in the rear of the projectile.

References Cited by the Examiner

UNITED STATES PATENTS

| | | | |
|---|---|---|---|
| 1,940,657 | 12/1933 | Woodford | 102—43 |
| 2,048,267 | 6/1936 | Keith | 102—43 |
| 2,950,680 | 8/1960 | Mills | 102—41 |

FOREIGN PATENTS

| | | |
|---|---|---|
| 360,667 | 4/1906 | France. |
| 89,994 | 1/1897 | Germany. |
| 25,890 | 11/1901 | Switzerland. |

BENJAMIN A. BORCHELT, *Primary Examiner.*

SAMUEL FEINBERG, *Examiner.*

R. F. STAHL, *Assistant Examiner.*